Patented Feb. 28, 1950

2,498,931

UNITED STATES PATENT OFFICE 2,498,931

MANUFACTURE OF RUBBER-LIKE PRODUCTS

Hans Paul Wagner, Atlanta, Ga.

No Drawing. Application April 9, 1945,
Serial No. 587,445

19 Claims. (Cl. 260—41.5)

This invention relates to manufacture of rubber-like products; and it comprises a method of manufacturing synthetic materials having many of the properties of natural rubber, wherein a sulfur-sulfide gum is compounded with a small amount of a dithiocarbamate which is nitrogen-substituted with at least one organic radical, followed by compounding the so-softened gum with a butadiene-vinyl compound copolymer, such as GR—S; said sulfur-sulfide gum being the reaction products of ethylene dichloride with a freshly prepared sulfur-sulfide dispersion produced by dispersing sulfur in an aqueous solution of an alkali metal monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of about 1 part of sulfur to from about 0.85 to 0.98 part of sodium monosulfide and from about 1.1 to 1.25 parts ethylene dichloride, the reaction taking place in a closed reaction vessel at pressures ranging from about 7 to 20 pounds per square inch, at temperatures ranging from about 140° to 210° F. and within corresponding time periods not substantially exceeding 120 to 10 minutes. The invention also includes the rubber-like products resulting from the described process; all as more fully hereinafter set forth and as claimed.

This application is a continuation-in-part of my copending application, Serial Number 516,077, filed on December 29, 1943, now abandoned. In my copending applications Serial Numbers 480,690; 500,421 (now abandoned) and 573,634, I have described and claimed the manufacture of a new sulfur-sulfide gum having many of the properties of natural rubber. As described in these prior applications this gum is produced by reacting a freshly prepared unstable sulfur-sulfide dispersion, prepared at temperatures below the boiling point, with ethylene dichloride in a closed reaction vessel and the resulting rubber-like product is recovered. In these prior applications the compounding of the sulfur-sulfide gum with nitrogen-substituted dithiocarbamates is also disclosed and claimed.

I have discovered that my sulfur-sulfide gum can be readily compounded with synthetic copolymers of butadiene and vinyl compounds, such as styrene, isoprene and acrylonitrile, provided that it is first compounded with from about 0.25 to 2.0 per cent by weight of a nitrogen-substituted dithiocarbamate serving as a compounding or blending agent. The new products thus produced have characteristic properties which are unlike those of either of the ingredients. For this reason, I believe that these products can be considered new synthetic rubbers or copolymers, entitled to a separate status in the art. The distinctive characteristics of these new compounds can be explained best on the basis that there is a copolymerization between the sulfur-sulfide gum and the butadiene-vinyl compound gums. The latter are known to contain olefinic linkages, while my sulfur-sulfide gum probably contains sulfur atoms having free bonds, as indicated by the suggested equation of reaction given in Serial Number 573,634. It is believed that these free bonds unite with the olefinc linkages of the butadiene-vinyl gums in some fashion thereby producing copolymerization. That a chemical combination actually takes place is shown by the fact that the sulfur-sulfide gum serves as a vulcanizing agent, no added sulfur being required for curing purposes. This shows that the sulfur-sulfide gum contains sulfur in labile or available form for vulcanization of the butadiene-vinyl gums. For these reasons it appears that it is proper to call my new products copolymers.

The dithiocarbamates have several remarkable effects upon my sulfur-sulfide gum, as explained in Serial Number 573,634. With natural and most synthetic rubbers they serve as vulcanization accelerators, but with my sulfur-sulfide gum they act as softeners or plasticizers. More important they substantially eliminate the production of lachrymatory gases during milling and molding and they prevent blistering in the mold, during and after curing. They have an important stabilizing effect on my gum and substantially eliminate age hardening. They lower the brittle point and substantially increase the tensile strength, the elongation and tear resistance. They produce such an over-all improvement in properties that my gums, when compounded therewith, will pass the Government specifications for butadiene-styrene rubbers. In view of these facts it is my belief that a chemical combination takes place between my gum and the dithiocarbamates resulting in the formation of new chemical compounds.

The discovery that these nitrogen substituted dithiocarbamates are capable of serving as blending or compounding agents, in enabling the compounding of my gums with butadiene-vinyl compound gums, is believed to be even more surprising. I have found that my gums, in the absence of these dithiocarbamates, can be compounded with other rubbers only imperfectly if at all. But, when softened with a small amount of a dithiocarbamate, my gums combined with these rubbers very readily, in fact better than any of these gums combine with each other. More surprising, the combined products can be then compounded very readily and quickly with any of the usual compounding pigments, even more rapidly than with natural rubber, for example. This is true even in the case of those rubbers which show great reluctance to absorb such pigments prior to combining with my gum. These rubbers can actually be combined with my gum and then with the usual compounding pigments much more quickly than they can be compounded with the latter alone.

In the case of GR—S for example, it usually requires 40 minutes or longer to compound this with the usual compounding pigments, which is an important disadvantage of this product. But when my sulfur-sulfide gum is mixed with a nitrogen substituted dithiocarbamate, such as piperidinium N-pentamethylene dithiocarbamate, for example, it can be compounded with GR—S and with the usual compounding pigments in a period ranging from about 7 to 10 minutes in commercial size mill batches. This saving in time is particularly important in view of the present labor shortage and shortage of milling equipment. Another substantial saving in time is realized in the curing operation, since the new product can be cured in from about 5 to 45 minutes at a temperature ranging from about 250° to 320° F. Moreover a 20 to 40 per cent overcure has no detrimental effect on the properties.

That my new copolymers, formed by combining my sulfur-sulfide gum with butadiene-vinyl compound gums, such as GR—S, for example, possess new characteristics, unlike those of either of the components employed, can be readily demonstrated. The feel and handling of the copolymer is more like natural rubber than either of the components. It burns slower than either of the components with a flame which is luminous while not being smoky and containing only a slight amount of SO$_2$, whereas the sulfur-sulfide gum burns with non-luminous blue flame containing large quantities of SO$_2$, and GR—S burns with a highly smoky flame. The copolymer, when soaked in carbon disulfide for a period of 9 days, dissolves completely, thus resembling GR—S, while the sulfur-sulfide gum alone under the same conditions shows no signs of swelling or dissolving. The copolymer develops a tack upon milling which is present in neither product alone to such an extent and is very similar to the tack of natural rubber. The time required for curing the copolymer is shorter than that required for either of the components. The shrinkage in the mold of the copolymer is not more than that of natural rubber, while the shrinkage of GR—S frequently runs as high as 5 per cent, which is an important disadvantage of this product. The new copolymer can be cured in the mold without the addition of sulfur under 80 to 90 pounds steam pressure, without blistering and without appreciable gassing and it can be removed from the mold while hot. In contrast GR—S under these conditions would not cure without adding sulfur and then it would shrink in the mold, whereas my sulfur-sulfide gum would gas and blister at such high curing temperatures. The sulfur-sulfide gum remains thermoplastic even after curing while the copolymer is thermosetting. The tensile strength of the copolymer, with the same compounding and proper curing, is substantially equal to that of GR—S or even higher, while being substantially higher than that of my sulfur-sulfide gum.

For example, a sulfur-sulfide gum compounded with 45 per cent carbon black and cured at 40 pounds steam pressure will have a tensile strength of about 1200 pounds per square inch. A GR—S rubber similarly compounded and cured with the aid of sulfur as a vulcanizing agent will have a tensile strength of about 2200 p. s. i. But when my new polymer, formed of a 50–50 mixture of sulfur-sulfide gum, is similarly compounded and cured (without any addition of sulfur) it will have a tensile strength of about 2200 p. s. i. This demonstrates that the properties of the new compound are not the average of its components. When GR—S is added to my sulfur-sulfide gum, plasticized with dithiocarbamate, the GR—S immediately turns from dark brown to light brown or amber. On further milling, and before the addition of any of the pigments the new copolymer turns to a light grayish green color. This is indicative of chemical reaction between the compounds, and the formation of the new copolymer, which is a new type of synthetic rubber. Moreover, the cold flow of the new product is not greater than that of GR—S while being substantially less than that of the sulfur-sulfide gum.

It is shown in my acknowledged copending application, Serial No. 573,634, that gums of distinctly different and inferior properties are produced if the sulfur-sulfide dispersion used in making my sulfur-sulfide gum is boiled under a reflux condenser to produce a polysulfide solution prior to reacting it with ethylene dichloride. It is also shown that an inferior product is produced if the reaction with ethylene dichloride is conducted at atmospheric pressure, using a reflux condenser, instead of under pressure in a closed reaction vessel.

The polysulfide gums produced by reacting polysulfide solutions with ethylene dichloride differ from my sulfur-sulfide gums in that they do not combine with synthetic rubbers, such as GR—S, for example, to produce copolymers— rather they produce what amounts to a mechanical mixture of the two gums. Thus, Thiokol-N swells to about twice the original size and becomes a non-tacky, jelly-like mass, when soaked for 9 days in carbon disulfide, while GR—S dissolves completely under the same conditions. But when GR—S is compounded with Thiokol-N with the aid of piperidinium N-pentamethylene- dithiocarbamate in exactly the same manner as used in preparing my new copolymer, and when the resulting mixed gum is soaked in carbon disulfide, the GR—S dissolves out of the mixture leaving the Thiokol-N in a swollen, jelly-like state similar to that produced with Thiokol-N alone. In contrast, as mentioned previously, my copolymer dissolves completely under the same conditions, even though my sulfur-sulfide gum alone does not dissolve or swell in contact with carbon disulfide within a period of about 6 days.

That the copolymer of my sulfur-sulfide gum and GR—S is suitable for tire retreading is shown by the tests which have been made on the use of this copolymer in the production of camelback. In one test, for example, a tire was retreaded with 7 pounds of this copolymer camelback, applied to the casing through the use of reclaim tire cement, and subsequent molding a 55 pounds steam pressure for one hour. During the curing no obnoxious gases were given off, and at the end of the molding period no blistering was noticed in the retreaded portion of the tire. This tire was then run at speeds averaging 50 miles per hour for 2,600 miles, over cement, asphalt and rough secondary roads. At the end of the mileage test, the tire was found to have lost only 9 ounces of its retreaded weight. Cuts from sharp objects during the road test did not show "cut growth," a very serious disadvantage in the utilization of GR—S. Also, at no point of the junction of the camelback to the tire casing was there separation, a factor not apparent in the use of GR—S as retreading camelback.

Complete absorption of pigments in the new coloymer is indicated by the fact that heels made therefrom do not scuff or mark the floor, as in the case of heels made of GR—S, for example, or other rubber substitutes used for this purpose. With suitable compounding the Shore hardness of my copolymers can be varied within the range of about 50 to 100. They have considerable resilience and mechanical strength, and a rebounce of up to 50% with a Shore hardness of 100.

My tests indicate that my sulfur-sulfide gum can be combined with any of the rubber-like copolymers of butadiene and vinyl compounds, containing the group CH$_3$=CH—, such as isoprene, styrene and acrylonitrile, including GR—S, a modified butadiene-acrylonitrile copolymer and a modified butadiene-styrene copolymer. And any of the dithiocarbamates, which are nitrogen-substituted with at least one organic radical, are useful as blending or compounding agents in my process. These compounds include piperidinium N-penta-methylene-dithiocarbamate, hexamethylene ammonium hexamethylene dithiocarbamate and zinc-dimethyl-dithiocarbamate. These compounds all contain the group

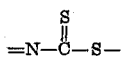

the nitrogen atom being substituted by an organic radical.

The raw sulfur-sulfide gum can be mixed with a dithiocarbamate and then compounded with a synthetic butadiene-vinyl compound copolymer or the sulfur-sulfide gum can be first precured, before the addition of the dithiocarbamate. The precuring step may be conducted by subjecting the raw gum to live steam pressure in an autoclave. Pressures of from 40 to 70 pounds per square inch for a period of from 90 to 30 minutes may be employed for example. I have found it desirable to premix the compounding ingredients and to add this in one batch to the mill, either during or after admixture of the two gums.

My sulfur-sulfide gum, after plasticizing with a dithiocarbamate can be mixed with butadiene-vinyl compound copolymers in all proportions. The most advantageous proportions range from about 10 to 80 per cent by weight based on the mixture. My tests indicate that it requires the presence of about 25 per cent sulfur-sulfide gum to fully react with GR—S. However, it only requires the addition of about 10 per cent sulfur-sulfide gum to GR—S to markedly improve its "pick-up" of compounding agents. The addition of about 30 to 50 per cent of the sulfur-sulfide gum eliminates the natural laciness of the broken down GR—S on the mill and forms a smooth sheet with smooth edges. This product can be extruded satisfactorily. On the other hand the addition of only 20 per cent of GR—S to my sulfur-sulfide gum markedly increases its tensile strength as well as its resilience, rebounce and tear resistance. The normal curing time required to produce a truly vulcanized product ranges from about 3 to 30 minutes at steam pressures of 90 to 30 pounds or at temperatures of from 320° to 250° F. In the production of hard rubbers the curing time may amount to 5 to 10 hours, for example. These hard rubbers, when properly compounded have very high tensile strengths.

My invention can be described somewhat more specifically by reference to the following specific examples which represent practical operating embodiments of my process in the making of useful copolymers.

*Example 1*

In the making of stock suitable for use in the manufacture of tire treads or rubber heels, the following ingredients are compounded on a mill:

1 pound sulfur-sulfide gum, precured or not precured
5 g. (piperidinium N pentamethylene-dithiocarbamate
1 pound GR—S
30 g. zinc oxide
30 g. titanium dioxide
4 g. stearic acid
50 g. pine tar
270 g. carbon black
5 g. dibenzthiazyl disulfide The sulfur-sulfide gum is first broken down on the mill with the aid of the dithiocarbamate. This produces a very plastic mass which produces no lachrymatory gases or obnoxious odors on the mill. The GR—S is then added to the plastic mass and is quickly taken up without delay producing a compound on the mill which rolls in a manner like that of natural rubber under like conditions. This mixture, surprisingly, exhibits a definite tack, which is true of neither of the components milled separately. At this point the other ingredients are added, in the form of a thoroughly premixed batch, to the bank of copolymer which has built up on the mill. Because of the peculiar properties of the copolymer the compounding agents are quickly absorbed, the total milling time required being only from about 7 to 10 minutes in commercial size batches. After the compounding agents have been thoroughly mixed in, the copolymer can be sheeted, extruded or molded. When cured for 45 minutes in the mold at 250° to 280° F. it forms a highly satisfactory tire tread.

*Example 2*

In the making of a stock suitable for use in the manufacture of the soles of shoes, the following ingredients are compounded on a rubber mill:

11 oz. sulfur-sulfide gum
4 g. piperidinium N-pentamethylene-dithiocarbamate
21 oz. GR—S
25 g. titanium dioxide
20 g. zinc oxide
50 g. pine tar
4½ g. stearic acid
270 g. carbon black
7 g. dibenzthiazyl disulfide These ingredients can be compounded in the manner described in Example 1.

Example 3

A "hard rubber" product, having a Shore hardness of from 95 to 100, can be made by compounding the following ingredients:

1 pound sulfur-sulfide gum, plasticized by 1% piperidinium N-pentamethylene-dithiocarbamate
1 pound GR—S
60 g. zinc oxide
4.5 to 5 g. stearic acid
50 to 60 g. pine tar
5 g. dibenzthiazyl disulfide
400 g. carbon black When cured for 5 hours at 60 pounds steam pressure, this gives a product having a Shore hardness of 95 to 100 but which has considerable mechanical strength, having a rebounce of 50 per cent. It softens only slightly if left in boiling water for 5 hours.

Example 4

Another tire retread stock can be made by compounding the following ingredients:

360 g. sulfur-sulfide gum
540 g. butadiene-acrylonitrile polymer
4 g. piperidinium N-pentamethylene-dithiocarbamate
25 g. zinc oxide
4 g. stearic acid
50 g. pine tar
80 g. rosin
270 g. carbon black
5 g. dibenzthiazyl disulfide This mix is compounded as described in Example 1. The rosin used in this batch increases the elongation. I have found that from 3 to 20 per cent by weight of this ingredient can be employed in my copolymers with beneficial results.

A series of tests were made varying the ratio of my sulfur-sulfide gum to GR—S from a 50-50 mixture, to a mixture containing 10 per cent sulfur-sulfide gum to 90 parts of GR—S. Tear resistance and tensile strength values were found to be fairly constant with copolymers containing from 50 to 30 per cent sulfur-sulfide gum.

I have found that if the zinc oxide used in the above formulas is replaced with titanium dioxide the resulting copolymers on curing tend to be of a softer character. In addition I have found that a reduction of the pine tar content of these copolymers, brings about a higher tensile strength, but also increases the milling time somewhat. When these products are compounded with 30 per cent carbon black, tensile strengths of about 1990 p. s. i. can be obtained whereas, if 45 per cent carbon black is employed, the tensile strength may reach 2500 p. s. i.

While I have described what I consider to be the best operating embodiments of my invention, it is evident, of course, that various modifications can be made in the specific procedures which have been described without departing from the purview of this invention. As indicated in my acknowledged application, best results are obtained in the production of my sulfur-sulfide gum when the sulfur-sulfide mixture employed is made from about 1 part sulfur to about 0.85 to 0.98 part of sodium monosulfide and when the ethylene dichloride is employed in proportions ranging from about 1.1 to 1.25 parts by weight. The optimum proportions to employ is about 0.9 part of the sulfide to one part of sulfur, and to 1.17 parts of the ethylene dichloride. The proportions of the reactants can, of course, be varied outside these ranges but the products thereby obtained are usually not as satisfactory. The addition of from about 0.2 to 5 per cent of iron oxide to the reaction mixture usually produces a favorable result. Any alkali metal sulfide can be employed in the process to make the sulfur-sulfide solution. The sulfur may be employed in any form but, of course, the more finely divided it is, the more readily it goes into dispersion. The quantity of water employed in the process can be varied but it is advantageous to employ minimum quantities in order that smaller reaction equipment may be employed. The sulfur-sulfide mixture, therefore, should be almost saturated.

In making up the sulfur-sulfide mixture the sulfur and sulfide may be added simultaneously to the water although the sulfur does not become dispersed until the sulfide has dissolved. This dispersion must be prepared in such fashion that the formation of polysulfides is avoided, that is, the temperature and time of heating are so controlled that the solution produced is unstable and capable upon standing of depositing substantially all of its sulfur content in excess of the monosulfide. This can be used as a test to determine the suitability of a sulfur-sulfide dispersion for the production of my gum. A polysulfide solution, in contrast, is stable and deposits little or no sulfur on standing.

I prepare my sulfur-sulfide dispersion by heating the mixture of sulfur and monosulfide solution to temperatures within the range of about 80° to 210° F. for corresponding periods of about 6 hours to about 30 minutes. The mixture should be stirred during dispersion but the vessel can be either open or closed. The reaction with ethylene dichloride, however, must be conducted in a closed reaction vessel with agitation at a temperature within the range of about 150° to 210° F. at which temperatures the pressure rises to within the range of about 7 to 20 pounds per square inch. The ethylene dichloride should be added gradually and the time of the reaction should be from about 120 to 5 minutes, depending upon the temperature. It is usually necessary to provide cooling of the reaction vessel to keep the temperature within the range stated. Best results are obtained within the range of about 160° to 170° F. with a reaction time of about 15 to 25 minutes.

The raw gum thus produced is highly resilient, capable of being molded under heat and pressure, reformed and again molded several times without losing its favorable properties. It contains about 75 per cent of sulfur; it is non-corrosive and stable, being unaffected by hydrocarbon solvents, substantially odorless and being capable of being compounded, milled and otherwise treated in all respects like natural rubber. When the crude gum is steam washed it softens at a temperature ranging from about 120° to 150° C. When compounded in the proportions of 100 parts to 10 parts of zinc oxide, ½ part of dibenzthiazyl disulfide, ¼ part of stearic acid and from 30 to 35 per cent of carbon black and then cured, it has a specific gravity of about 1.45, a tensile strength of about 1200 pounds per square inch, a Shore hardness of 60–70, an elongation of 300–500 per cent, a tear resistance of about 250 and a brittle point of about +5° F.

The sulfur-sulfide gum can be compounded with butadiene-vinyl compound gums to make my new copolymers by any of the conventional compounding processes. It is essential, however that the sulfur-sulfide gum be mixed with from about 0.25 to 5 per cent of dithiocarbamate before being compounded with the unsaturated gum. The dithiocarbamate cannot be mixed with the unsaturated gum before the compounding step for the reason that the dithiocarbamate acts as an accelerator on the unsaturated gum and does not soften it or produce a tack as it does in the case of my sulfur-sulfide gum. The copolymer itself can be mixed with any of the usual compounding agents as well as with the usual anti-oxidants, accelerators, deodorizing agents, reinforcing agents, softeners, fillers, etc. Non-freezing oils can be used to lower its freezing point. It is suitable for use in recapping tires, making rubber stamps, making bullet-proof gasoline tanks, rubber heels and soles and for practically all the conventional uses of natural rubber. Other modifications of my invention which fall within the scope of the following claims will be immediately evident to those skilled in this art.

What I claim is:

1. In the manufacture of rubber-like products, the process which comprises compounding a sulfur-sulfide gum with from 0.25 to 5.0 per cent by weight of a dithiocarbamate containing the group

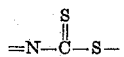

which is nitrogen-substituted with at least one organic radical and then compounding it with a copolymer of butadiene and an organic compound containing the group CH$_3$=CH— selected from a group consisting of isoprene, styrene and acrylonitrile, said copolymer having rubber-like properties; said sulfur-sulfide gum being employed in proportions ranging from 10 to 80 per cent by weight in the product and being produced by reacting a freshly-prepared unstable dispersion of sulfur in an aqueous sodium monosulfide solution, from which substantially all the sulfur in excess of the monosulfide precipitates upon standing, with ethylene dichloride in a closed reaction vessel at temperatures within the range of 140° to 210° F.; said dispersion containing from 0.85 to 0.98 part of sodium monosulfide to 1 part by weight of sulfur, this solution being reacted with from 1.1 to 1.25 parts by weight of ethylene dichloride, the reaction taking place within a time period not substantially exceeding 120 to 10 minutes the longer reaction times being used with the lower temperatures within the range stated.

2. The process of claim 1 wherein said sulfur-sulfide dispersion is produced at temperatures within the range of 80° to 210° F., the preparation taking place within a corresponding time period not substantially exceeding 6 hours to 60 minutes.

3. The process of claim 1 combined with the further step of compounding the resulting rubber-like product with from about 25 to 60 per cent by weight of carbon black based on the compounded product.

4. The process of claim 1 wherein the dithiocarbamate is employed in proportions ranging from about 0.25 to 5 per cent based on the weight of the sulfur-sulfide gum employed.

5. The process of claim 1 wherein said dithiocarbamate is piperidinium pentamethylene dithiocarbamate.

6. The process of claim 1 wherein said dithiocarbamate is zinc N-dimethyl-dithiocarbamate.

7. The process of claim 1 wherein said dithiocarbamate is hexamethylene ammonium hexamethylene dithiocarbamate.

8. The process of claim 1 wherein the copolymer is a copolymer of butadiene and styrene.

9. The process of claim 1 wherein the copolymer is a copolymer of butadiene and isoprene.

10. The process of claim 1 wherein the copolymer is a copolymer of butadiene and acrylonitrile.

11. The process of claim 1 wherein the sulfur-sulfide gum is precured by heating it, prior to the compounding steps.

12. The process of claim 1 wherein the sulfur-sulfide gum is produced using about 0.9 part of sodium monosulfide and 1.17 parts of ethylene dichloride to 1 part of sulfur.

13. In the manufacture of rubber-like products, the process which comprises compounding a sulfur-sulfide gum with from 0.25 to 5.0 per cent by weight of a dithiocarbamate containing the group

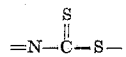

which is nitrogen-substituted with at least one organic radical and then compounding it with from 20 to 90 per cent by weight based on the weight of the product of a copolymer of butadiene and an organic compound containing the group CH$_3$=CH— selected from a group consisting of isoprene, styrene and acrylonitrile, said copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to from 0.85 to 0.98 part of sodium monosulfide and from 1.1 to 1.25 parts ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

14. In the manufacture of rubber-like products, the process which comprises compounding a sulfur-sulfide gum with from 0.25 to 5.0 per cent by weight of piperidinium pentamethylene dithiocarbamate and then with from 20 to 90 per cent by weight based on the weight of the product of a butadiene-styrene copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to about 0.85 to 0.98 part of sodium monosulfide and from 1.1 to 1.25 parts ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

15. In the manufacture of rubber-like products, the process which comprises plasticizing a raw sulfur-sulfide gum, precuring the plasticized gum by heating it, compounding the gum with from 0.25 to 5.0 per cent by weight of piperidinium pentamethylene dithiocarbamate and then with from 20 to 90 per cent by weight based on the weight of the product of a butadiene-styrene copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to from 0.85 to 0.98 part sodium monosulfide and from 1.1 to 1.25 parts ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

16. In the manufacture of rubber-like products, the process which comprises compounding a sulfur-sulfide gum with from 0.25 to 5.0 per cent by weight of a dithiocarbamate containing the group

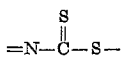

which is nitrogen-substituted with at least one organic radical and then compounding it with from 20 to 90 per cent by weight based on the weight of the product of copolymer of butadiene and an organic compound containing the group $CH_3=CH-$ selected from a group consisting of isoprene, styrene and acrylonitrile, said copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to 0.9 part of sodium monosulfide and about 1.17 parts of ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

17. A new rubber-like product comprising a sulfur-sulfide gum compounded with from 0.25 to 5.0 per cent by weight of a dithiocarbamate containing the group

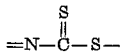

which is nitrogen-substituted with at least one organic radical and then with from 20 to 90 per cent by weight based on the weight of the product of copolymer of butadiene and an organic compound containing the group $CH_3=CH-$ selected from a group consisting of isoprene, styrene and acrylonitrile, said copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to from 0.85 to 0.98 part of sodium monosulfide and from 1.1 to 1.25 parts ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

18. A new rubber-like product comprising a sulfur-sulfide gum compounded with from 0.25 to 5.0 per cent by weight of piperidinium pentamethylene dithiocarbamate and then with from 20 to 90 per cent by weight based on the weight of the product of a butadiene-styrene copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to from 0.85 to 0.98 part sodium monosulfide and from 1.1 to 1.25 parts ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

19. A new rubber-like product comprising a sulfur-sulfide gum compounded with from 0.25 to 5.0 per cent by weight of piperidinium pentamethylene dithiocarbamate and then with from 20 to 90 per cent by weight based on the weight of the product of a butadiene-styrene copolymer having rubber-like properties; said sulfur-sulfide gum being the reaction products of ethylene dichloride with a freshly prepared sulfur-sulfide dispersion produced by dispersing sulfur in an aqueous solution of sodium monosulfide at temperatures below the boiling point and for a time serving only to produce a dispersion from which substantially all the sulfur in excess of the monosulfide precipitates upon standing, the sulfur, monosulfide and ethylene dichloride being employed in the proportions of 1 part of sulfur to about 0.9 part of sodium monosulfide and about 1.17 parts of ethylene dichloride, the reaction taking place in a closed reaction vessel at pressures ranging from 7 to 20 pounds per square inch, at temperatures ranging from 140° to 210° F. and within corresponding time periods not substantially exceeding 120 to 10 minutes.

HANS PAUL WAGNER.

REFERENCES CITED

The following references are of record in the file of this patent:

UNITED STATES PATENTS

| Number | Name | Date |
| --- | --- | --- |
| 2,040,698 | Lewis et al. | May 12, 1936 |
| 2,186,714 | Youker | Jan. 9, 1940 |
| 2,235,621 | Patrick | Mar. 18, 1941 |
| 2,278,127 | Patrick | Mar. 31, 1942 |

OTHER REFERENCES

Mellor, Comprehensive Treatise on Inorganic and Theoretical Chemistry, vol. 2, page 629, Published by Longmans, N. Y. 1922.